United States Patent [19]

Chang et al.

[11] Patent Number: 5,418,793
[45] Date of Patent: May 23, 1995

[54] METHOD AND APPARATUS FOR TESTING A COMPLEX ENTITY

[75] Inventors: James C. M. Chang, Holmdel; Karim M. Ghafouri, Tinton Falls; Edmond N. Hong, Howell; Christopher Kwan, Marlboro; Amit Limaye, Piscataway; Ramesh Sathyanarayana, Ocean Township, Monmouth County, all of N.J.

[73] Assignee: AT&T Corp., Murray Hill, N.J.

[21] Appl. No.: 80,881

[22] Filed: Jun. 22, 1993

[51] Int. Cl.$^6$ .................................. G01R 31/28
[52] U.S. Cl. ........................ 371/27; 371/15.1; 371/25.1
[58] Field of Search ............ 371/27, 15.1, 23, 25.1; 324/23.1; 364/487, 148, 149, 579, 580

[56] References Cited

U.S. PATENT DOCUMENTS

| | | | |
|---|---|---|---|
| 4,692,921 | 9/1987 | Dahbura et al. | 371/27 |
| 4,884,217 | 11/1989 | Skeirik et al. | 364/513 |
| 4,991,176 | 2/1991 | Dahbura et al. | 371/27 |
| 5,159,600 | 10/1992 | Chintapalli et al. | 371/27 |
| 5,228,040 | 7/1993 | Agrawal et al. | 371/22.1 |

OTHER PUBLICATIONS

OSI/NM Forum-Forum Glossary-Forum 005-Issue 1.0-Jan., 1990-pp. 1-13.
Network Management Forum-Forum Library-vol. 1 Supplement: DIS GDMO Translation-Forum 006-Issue 1.1-Aug., 1991-pp. 1-282.
Network Management Forum-Forum Library-vol. 2-Testing Management Definitions-Forum 006-Issue 1.0-Aug., 1991-pp. 1-77.
Network Management Forum-Forum Library-vol. 3-Scheduling Management Definitions-Forum 006-Issue 1.0-Aug., 1991-pp. 1-44.
OSI/NM-Managed Object Naming and Addressing-Forum 007-Issue 1.0-May, 1990-pp. 1-49.
Network Management Forum-Forum Release 1-Conformance Requirements-Forum 008-Issue 1.1-Aug., 1991-pp. 1-20.
OSI/NM Forum-Shared Management Knowledge-Forum 009-Issue 1.0-Jun., 1990-pp. 1-22.
OSI/NM Forum-Strategy for Migration to GDMO-Forum 010-Issue 1.0-Jan., 1991-pp. 1-33.
OSI/NM Forum-Registration of ASN.1 Object Identifiers for Object Classes, Name Bindings, Attributes, and Supporting Definitions-Forum 011, Issue 1.0, Jan., 1991, pp. 1-60.
Network Management Forum-Application Services: Testing Management Function-Forum 012-Issue 1.0-Aug., 1991-pp. 1-82.
Network Management Forum-Application Services: Scheduling Management Function-Forum 013-Issue 1.0-Aug., 1991-pp. 1-26.
Network Management Forum-OSI/Network Network Forum-Application Services: Event, Configuration, and Alarm Management-Forum 002 Issue 1.3-Aug., 1991-pp. 1-1-R-1 (Jun., 1990).

(List continued on next page.)

Primary Examiner—Emanuel T. Voeltz
Assistant Examiner—Craig Steven Miller
Attorney, Agent, or Firm—Jack R. Penrod

[57] ABSTRACT

A method and apparatus for conformance testing of complex entities, such as networks and their protocols. Networks that have their managed objects, attributes and notifications defined in industry standard ASN.1 notation can be methodically processed according to finite state machine models of their managed objects to provide optimum test cases for conformance testing. These test cases are optimum in that they are minimized according to a cost criterion, while designed to test each state of the finite state machine model at least once. A data base stores the optimum test cases of the managed objects to support testing of the defined and modeled network. The method further applies these optimum test cases via a test apparatus to a system-under-test, e.g. a network, to test conformance thereof to its specifications.

8 Claims, 3 Drawing Sheets

OTHER PUBLICATIONS

OSI/NM Forum–Object Specification Fraemwork–Forum 003, Issue 1.0–Sep., 1989–pp. 1-1-2.

OSI/NM Forum–Forum Architecture–Forum 004–Issue 1.0–Jan., 1990–pp. 1-1-R-2.

Forum Protocol Specification Issue 1–Jun., 1990, pp. C-1-C-145.

OSI/Network Management Forum–Protocol Specification Addendum 1 to Issue 2.0–CMIP/Rose Asn. 1–Feb., 1991–Appendix D–pp. D-1-D18.

Network Management Forum–Protocol Specification–Forum 001–Issue 2.0–Aug., 1991, pp. 1–41.

International Telecommunication Union–CCITT x.722–Geneva, 1992 CCITT Rec. X.722 (1992 E), pp. 1–50.

CCITT Recommendation X.208–Melbourne, 1988–Fascicle VIII.4–pp. 57–130.

International Telecommunication Union–COM VII-2-1-E1-Mar., 1993–ISO/IEC DIS 8824-1–CCITT Draft Rec. X.680, pp. 1–155.

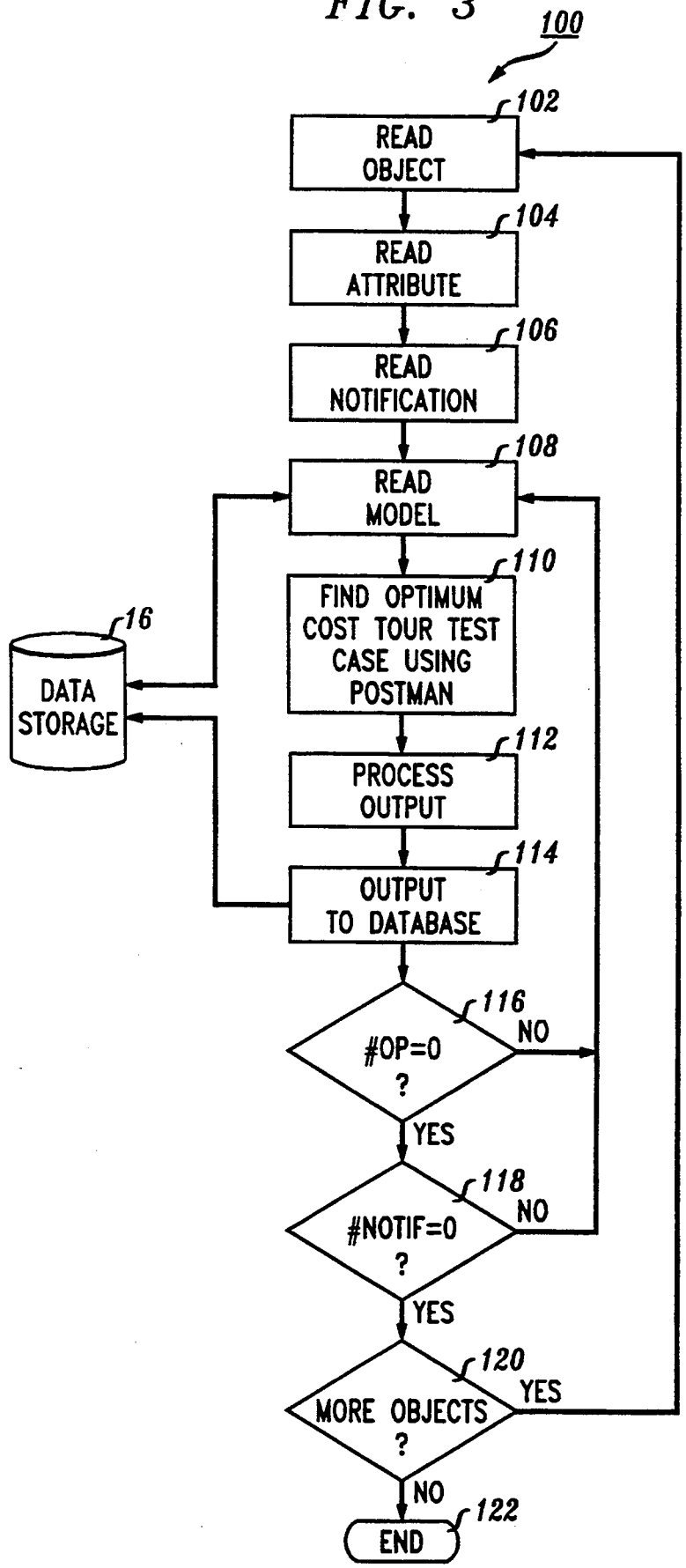

METHOD AND APPARATUS FOR TESTING A COMPLEX ENTITY

FIELD OF THE INVENTION

This invention relates to testing of an entity and more particularly to the creation and application of test cases for an entity that is described in a standard notation.

BACKGROUND OF THE INVENTION

Complex entities, such as large systems and large networks, that ultimately must function with other equipment depend upon various standards to ensure that the entities will function when installed. Before installation of a system or a network, it is very valuable to uncover as many errors as possible in the implementation. This reduces the costly process of identifying and correcting errors after the system or network is installed with other equipment. Further, in those situations where the manufacturer and the system and network owner are different from each other, it is very common to require conformance to a specific standard of operation. Thus, thorough testing of complex entities is desirable from both a cost standpoint and a standards standpoint.

Complex systems and complex networks understandably have complex standards that specify the operation they must provide in order to be in conformance thereto. Moreover, exhaustive testing of some complex systems and networks, i.e. testing of every possible combination of states, is impractical if not impossible. Instead, testing each state of a complex system or network at least once is a commonly used strategy. This type of testing is called conformance testing because it tests the responses of the entity against the responses required to conform to the governing standard.

Conformance testing for some moderately complex entities such as systems utilizing an ISDN protocol or a VLSI circuit are disclosed in U.S. Pat. Nos. 4,692,921 issued to A. Dahbura et al. on Sep. 8, 1987, and U.S. Pat. No. 4,991,176 issued to Dahbura et al. on Feb. 5, 1991. Both of these patents are commonly assigned to the assignee hereof and both are hereby incorporated by reference. The former patent presents a method for generating unique input/output sequences of optimum length that test every edge of a finite state machine that represents the entity under test. The latter patent, is similar, but its method generates unique input/output sequences of optimum cost instead of optimum length. Neither of these known methods for generating test sequences has a broad enough scope to provide all the capabilities for generating and storing test sequences for conformance testing of more complex entities, such as networks governed by the OSI Network Management protocol and systems.

Thus, there is a need for a conformance test method and apparatus that provides the generation, selection, parametrization and execution of test cases to test complex entities, such as an OSI Network Management protocol implementation and the system hardware that the OSI Network Management protocol is implemented on.

SUMMARY OF THE INVENTION

Briefly stated, in accordance with one aspect of the invention, the aforementioned need is fulfilled by providing a method for developing test cases for evaluating an operation of a system that is characterized by a group of objects with each object characterized by a finite state machine model. This method includes generating an object library from a list of object template notations corresponding to the group of objects in the system under test that are expressed in an abstract syntax notation, storing the resulting object library in a data base in a test computer, generating an attribute library from a list of attribute template notations corresponding to each attribute of the system under test that are similarly expressed in abstract syntax notation, storing the resulting attribute library also in the data base in the test computer, generating a notification library from a list of notification template notations corresponding to each notation of the system under test that are similarly expressed in abstract syntax notation, storing the resulting notification library also in the data base of the computer. After these three related libraries are completed, each of the group of objects is represented by a finite state machine model that is closest thereto out of a set of generic behavior finite state machine models and the respective data entries therefor in the object library, the attribute library and the notification library are read and inputted thereto. From the data entries and the finite state machine models, a tour input is prepared for each of the group of objects and each tour input is processed using a POSTMAN software tool to generate the optimum cost test case tour for each object. These optimum cost test case tours that are generated are stored in the data base in the test computer.

In another aspect of the invention, the aforementioned need is fulfilled by providing the method described above with a further provision of analyzing a protocol implementation conformance statement and protocol implementation extra information for testing (PICS/PIXIT) of an implementation and generating an implementation specific test case based on one of the optimum cost test cases. After the implementation specific test case has been generated, it is stored in the data base of the test computer with the optimum cost test cases for testing of that implementation.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

FIG. 3 is a flow diagram illustrating the method used by the test system shown in FIG. 1 to generate optimum cost test cases for conformance testing.

DETAILED DESCRIPTION

Figure 1:
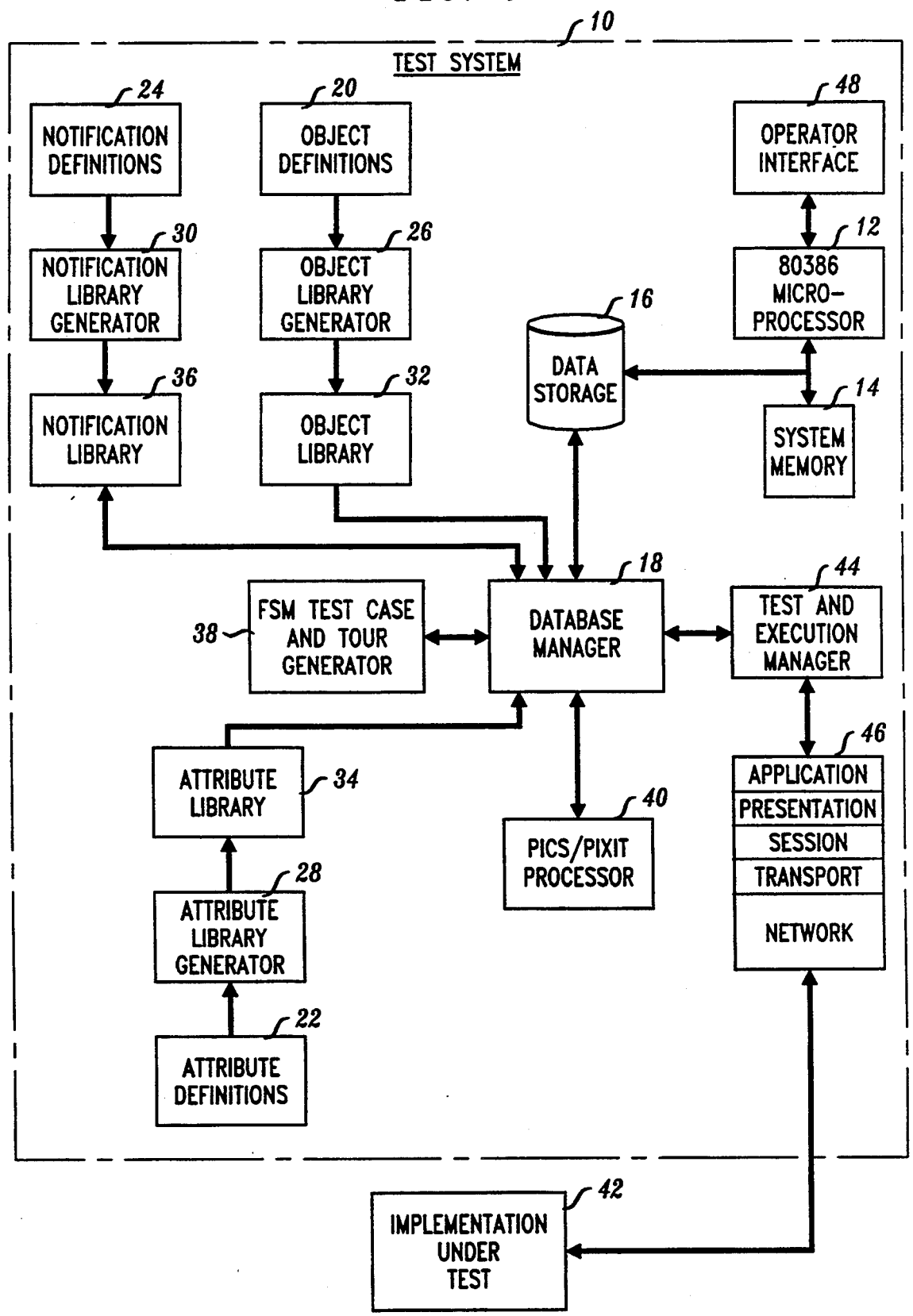
FIG. 1 is a block diagram illustrating a test system according to the invention that is connected to an implementation of a complex entity under test.

Referring now to FIG. 1, a test system 10 according to one embodiment of the invention is shown. Test system 10 may be used to test an entity's conformance to its specifications, such as the OSI Network Management protocol and application message set standards. The test system 10 has the capability of generating test cases and performing conformance testing based on the protocol test purposes defined by Network Management Forum (formerly OSI Network Management Forum), "OSI Network Management Forum Release 1.0 Specification Set" June 1989. The preferred embodiment of the test system 10 is a computer system having an Intel 80386 type microprocessor 12, and having a UNIX ® operating system (available from UNIX Systems Laboratories). The preferred embodiment of the test system 10 has 32 megabytes of RAM as the system memory 14 and a 600 megabyte hard drive as the system mass data storage unit 16. A high level data base manager 18, such as INFORMIX data base manager operating on top of the UNIX operating system, manages most of the data organization, storage and retrieval for the other applications of the test system 10.

The preferred embodiment of an Intel 80386 based computer system is given by way of example and not of limitation. Those in the art will recognize that other hardware platforms could be used equally well.

Test system 10 has OSI Network Management object definitions 20, OSI Network Management attribute definitions 22 and notification definitions 24 stored therein. The definitions 20, 22 and 24 are in terms of Guidelines for the Definition of Managed Objects (GDMO) defined by CCITT X.722, and Abstract Syntax Notation One (ASN.1) defined by CCITT Recommendation X.208 and ISO 8824. According to OSI Network Management Specifications, an object is a view of one or more resources that may exist independent of network management concerns, may exist as a relationship between resources, or may exist to support the management of other resources. An OSI Network Management attribute is a property of an OSI Network Management object or a property of an association among OSI entities. Each OSI Network Management attribute has a value. A notification is an act of informing about an event that occurred in an OSI Network Management object. 10 The OSI Network Management object definitions 20, OSI Network Management attribute definitions 22 and notification definitions 24 are inputted to object library generator 26, attribute library generator 28 and notification library generator 30, respectively. The library generators 26, 28 and 30 are similar in nature and operation. Each of the library generators 26, 28 or 30 is based upon the MetaTool software tool. MetaTool version 2.0 is a tool based on the "lex" and "yacc" operations that were developed by AT&T Bell Laboratories that automates parse tree building, traversals and source code generation.

Each of the library generators 26, 28 and 30 parses and processes its respective definitions 20, 22 and 24 into output data stored in object library 32, attribute library 34 and notification library 36, respectively. During parsing, intermediate information is extracted from the definitions 20, 22 and 24 and this intermediate information is subsequently used by a fill process to populate various data structures. These data structures are processed by the library generators 26, 28 and 30 for storage in libraries 32, 34 and 36 respectively using INFORMIX and/or for presentation to Finite State Machine (FSM) test case and tour generator 38.

Figure 2:
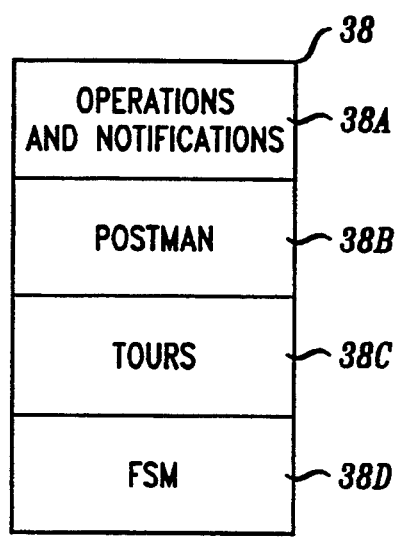
FIG. 2 is a block diagram illustrating details of the FSM Test Case and Tour Generator shown in FIG. 1.

Referring now to FIG. 2, the FSM test case and tour generator 38 uses operations and notifications model files 38A that are manually created and are specifically modeled for generic operations and notifications. Each operations and notifications file 38A is associated with an FSM model file 38D. Each FSM model 38D and it associated operations and model file 38A is processed by the POSTMAN software tool 38B into a tour 38C. The POSTMAN software tool 38B is a computer program written by AT&T Bell Laboratories for generating a compact test sequence to check the conformance of a protocol implementation (or any other entity that is modeled as a FSM) to its specification. The result of the POSTMAN software tool 38B processing data from libraries 32, 34 and 36 with regard to operations and notifications models 38A and FSM models 38D representing the implementation under test are test cases optimized to provide maximum coverage test tours 38C of the FSM models 38D at optimum costs.

Referring now to FIG. 3, further details of the test case generation process 100 will be described. Process 100 starts with action 102 which reads the first processed OSI Network Management object definition from object library. After action 102, process 100 proceeds to action 104, which reads the processed OSI Network Management attribute definition for the processed OSI Network Management object definition read in action 102. After action 104, process 100 proceeds to action 106, which reads the processed notification definition for the processed OSI Network Management object definition read in action 102. After action 106, process 100 proceeds to action 108, which reads the finite state machine model corresponding to the OSI Network Management object definition read in action 102. This finite state machine model is manually prepared specifically for generic operations or notifications and stored in the data base of test system 10 before the start of process 100.

Action 110, which is next, takes the data of actions 102, 104, 106 and 108 and uses the POSTMAN software tool to find the test case tour that completely tests the FSM model at optimum cost.

Action 112, which is next, takes the test case tour, which consists of a sequence of steps including preambles and postambles, and processes it further to provide protocol constraint testing capabilities. The processing of action 112 does not alter the purpose of each test. After action 112, action 114 outputs the test case tour to the database manager 18 (shown in FIG. 1) for storage.

Action 116, the next action, is a decision which checks if all of the operations associated with the OSI Network Management object read during action 102 have been completed. If the decision is no, then the process 100 loops back to action 108 and data representing the next operation for the FSM model for the OSI Network Management object last read by action 102 is inputted. The data representing the next operation is then processed through action 110 and a optimum cost test case tour therefor. Actions 112 and 114 process and output the test case tour for this operation according to the operation data just as these actions had handled the previous operation. Next is action 116 which started the next operation loop back. Thus, actions 116, 108, 110, 112, 114 and 116 will be repeated as long as there is a operation associated with the last OSI Network Management object read during action 102 unprocessed. Thus, test case tours for all operations of an OSI Network Management object are found and stored. When the decision at action 116 is yes all operations for this OSI Network Management object have been completed, process 100 proceeds to action 118.

Action 118 is a decision which checks if all of the notifications associated with the OSI Network Management object read during action 102 have been completed. If the decision is no, then the process 100 loops back to action 108 and data representing the next notification for the FSM model for the OSI Network Management object last read by action 102 is inputted. The data representing the next notification is then processed through action 110 and a optimum cost test case tour therefor. Actions 112 and 114 process and output the test case tour for this notification according to the notification data just as these actions had handled the previous notification. Next is action 116 which at this point should have a yes decision and the process should proceed to action 118. Action 118 started the next notification loop back. Thus, actions 118, 108, 110, 112, 114, 116 and 118 will be repeated as long as there is a notification associated with the last OSI Network Management object read during action 102 unprocessed. Thus, test case tours for all notifications of an OSI Network Management object are found and stored. When the decision at action 118 is yes all notifications for this OSI Network Management object have been completed, process 100 proceeds to action 120.

Action 120 is a decision which checks if the implementation has a further OSI Network Management object to be tested. If the answer at action 120 is yes, i.e. there is another object to be processed, and the process 100 loops back to action 102 to read the definitions of the next object of the implementation. Thus, actions 102, 104, 106, 108, 110, 112, 114, 116, 118 and 120 will be repeated until all the operations and all the notifications of all of the objects of an implementation have been processed. After that, the answer to decision 120 is no, i.e. all of the objects of the implementation have been processed, and the process 100 ends at action 122.

After action 122, data storage unit 16 has all of the optimum cost test case tours necessary to perform an optimum conformance test on an implementation.

Referring back to FIG. 1, OSI conformance testing sometimes calls for more than the optimum cost test case tours generated by process 100. When that occurs, the optimum cost test case tours are augmented by analyzing a protocol implementation conformance statement and protocol implementation extra information for testing (PICS/PIXIT) of an implementation by PICS/PIXIT processor 40 and generating an implementation specific test case based on one of the optimum cost test cases. After this implementation specific test case is generated, it is stored in the data storage unit 16 with the optimum cost test cases for the implementation. At this point, test system 10 has all of the test case tours necessary to perform an OSI conformance test on a specific implementation.

To perform conformance tests, the implementation, henceforth referred to as the implementation under test (IUT) 42, is connected to test system 10. In the preferred embodiment, this connection is made using an X.25 link, but those skilled in the art will recognize that various other links might be used for communication between test system 10 and IUT 42, but such modifications are deemed to be minor modifications within the scope of the present invention.

To test IUT 42, PICS/PIXIT test data information for the specific implementation that is stored in the data storage unit 16 is retrieved by instructions from the data base manager 18. The processor 12 selects all the test cases applicable to that specific IUT, prepares each test case with the relevant PICS/PIXIT test data and stores all the IUT applicable test cases in the data base in an IUT test case repository in either memory 14 or a combination of memory 14 and data storage 16 if too large for memory 14 alone. Next, test system 10 initiates a test and execution manager 44 to fetch a test case from data base manager 18.

Test and execution manager 44 analyzes each test case fetched and coordinates and controls the transmitting of test sequences within a test case. The test and execution manager then processes a test sequence and passes it on to an UNIX Systems Laboratory Open Network Platform (ONP (R)) Core Stack (ONP is a registered trademark of UNIX Systems Laboratory), that in turn generates the protocol data units to be sent through the (N−1) layer service provider to the IUT 42. The test sequence is received from the IUT 42 and validated for possible syntax errors. This testing process is repeated for the other test sequences in the test case and a verdict is finally determined by test and execution manager 44 and stored by the data base manager 18 in a IUT test case verdict repository. The test results may be viewed by an operator via an operator interface 48.

Thus, it will now be understood that there has been disclosed a method and apparatus for OSI testing. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. A method for developing test cases for evaluating an operation of a system, said system characterized by a plurality of objects and each object characterized by a finite state machine model, said method comprising the steps of:
   generating an object library from a list of object template notations corresponding to said plurality of objects in the system under test that are expressed in abstract syntax notation;
   storing said object library in a data base;
   generating an attribute library from a list of attribute template notations corresponding to each attribute of the system under test that are expressed in abstract syntax notation;
   storing said attribute library in the data base;
   generating a notification library from a list of notification template notations corresponding to each notation of the system under test that are expressed in abstract syntax notation;
   storing the notification library in the data base;
   representing each of said plurality of objects by a finite state machine model that is closest thereto from a plurality of generic behavior finite state machine models;
   for each of said plurality of objects, reading the respective data entries in the object library, the attribute library and the notification library therefor and inputting the respective data entries to the finite state machine model for that object;
   preparing a tour input for each of said plurality of objects from said data entries and said finite state machine model;
   processing each tour input using a postman process to generate the optimum cost test case tour for each finite state machine model of each object; and
   storing each optimum cost test case tour generated in the data base.

2. The method as set forth in claim 1, wherein said abstract syntax notation conforms to ASN.1.

3. The method as set forth in claim 1, further comprising the steps of: analyzing a protocol implementation conformance statement and protocol implementation extra information for testing of an implementation to be tested; and generating an implementation specific test case based on one of the optimum cost test cases.

4. A method for evaluating an operation of a system under test by developing and using test cases therefor, said system under test is characterized by a plurality of objects and each object is characterized by a respective finite state machine model, said method comprising the steps of:

generating an object library from a list of object template notations corresponding to said plurality of objects in the system under test that are expressed in abstract syntax notation;

storing said object library in a data base;

generating an attribute library from a list of attribute template notations corresponding to each attribute of the system under test that are expressed in abstract syntax notation;

storing said attribute library in the data base;

generating a notification library from a list of notification template notations corresponding to each notation of the system under test that are expressed in abstract syntax notation;

storing the notification library in the data base;

representing each of said plurality of objects by a finite state machine model that is closest thereto from a plurality of generic behavior finite state machine models;

for each of said plurality of objects, reading the respective data entries in the object library, the attribute library and the notification library therefor and inputting the respective data entries to the finite state machine model for that object;

preparing a tour input for each of said plurality of objects from said data entries and said finite state machine model;

processing each tour input using a postman process to generate the optimum cost test case tour for each finite state machine model of each object;

storing each optimum cost test case tour generated in the data base;

sequentially applying each of said optimum cost test case tours to the system under test and comparing the responses from the system with the expected responses generated as part of the optimum cost test case tour; and recording for each optimum cost test case tour whether the response of the system under test is or is not the expected response therefor.

5. The method as set forth in claim 4, wherein said abstract syntax notation conforms to ASN.1.

6. The method as set forth in claim 4, further comprising the steps of:

analyzing a protocol implementation conformance statement and protocol implementation extra information for testing of the system under test; and generating an implementation specific test case based on one of the optimum cost test cases.

7. An apparatus for developing test sequences for evaluating an operation of a system, said system characterized by a plurality of objects and each object characterized by a respective finite state machine model, said apparatus comprising:

means for generating an object library from a list of object template notations corresponding to said plurality of objects in the system under test that are expressed in abstract syntax notation;

means for storing said object library in a data base;

means for generating an attribute library from a list of attribute template notations corresponding to each attribute of the system under test that are expressed in abstract syntax notation;

means for storing said attribute library in the data base;

means for generating a notification library from a list of notification template notations corresponding to each notation of the system under test that are expressed in abstract syntax notation;

means for storing the notification library in the data base;

means for representing each of said plurality of objects by a finite state machine model that is closest thereto from a plurality of generic behavior finite state machine models;

means for reading for each of said plurality of objects the respective data entries in the object library, the attribute library and the notification library therefor and inputting the respective data entries to the finite state machine model for that object;

means for preparing a tour input for each of said plurality of objects from said data entries and said finite state machine model;

means for processing each tour input using a postman process to generate the optimum cost test case tour for each finite state machine model of each object; and means for storing each optimum cost test case tour generated in the data base.

8. The apparatus as set forth in claim 7, further comprising:

means for sequentially applying each of said optimum cost test case tours to a system under test and comparing the responses from the system with the expected responses generated as part of the optimum cost test case tour; and means for recording for each optimum cost test case tour whether the response of the system under test is or is not the expected response therefor.

* * * * *